US012679331B2

(12) United States Patent
    Fujitake

(10) Patent No.:    US 12,679,331 B2
(45) Date of Patent:      Jul. 14, 2026

(54) HYBRID ELECTRIC VEHICLE WITH ADAPTIVE BATTERY DISCHARGE CONTROL FOR CATALYST WARM-UP

(71) Applicant: TOYOTA JIDOSHA KABUSHIKI KAISHA, Toyota (JP)

(72) Inventor: Yoshinori Fujitake, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 38 days.

(21) Appl. No.: 18/978,829

(22) Filed: Dec. 12, 2024

(65) Prior Publication Data

US 2025/0282342 A1    Sep. 11, 2025

(30) Foreign Application Priority Data

Mar. 7, 2024    (JP) ................................. 2024-035374

(51) Int. Cl.
    *B60W 20/16*       (2016.01)
    *B60W 10/06*       (2006.01)
    *B60W 10/08*       (2006.01)
    *B60W 10/26*       (2006.01)

(52) U.S. Cl.
    CPC ............ *B60W 20/16* (2016.01); *B60W 10/06* (2013.01); *B60W 10/08* (2013.01); *B60W 10/26* (2013.01)

(58) Field of Classification Search
    CPC ...... B60W 20/16; B60W 10/06; B60W 10/08; B60W 10/26
    See application file for complete search history.

(56) References Cited

FOREIGN PATENT DOCUMENTS

| | | | | | |
|---|---|---|---|---|---|
| JP | 2010042700 A | * | 2/2010 | ............. | Y02T 10/62 |
| JP | 2022175152 A | * | 11/2022 | ............. | Y02T 10/62 |

* cited by examiner

*Primary Examiner* — Scott A Browne
*Assistant Examiner* — Terry C Buse
(74) *Attorney, Agent, or Firm* — SoraIP, Inc.

(57)                  ABSTRACT

A hybrid electric vehicle includes a control device that performs travel control and battery control. The battery control includes: first discharge control that sets a lower limit voltage of the battery to a first lower limit value when the battery is not in a warm-up state of the catalyst device, and sets battery dischargeable power to a first upper limit value; and second discharge control that sets a lower limit voltage of the battery to a second lower limit value that is smaller than the first lower limit value when the battery is in a warm-up state of the catalyst device, and sets the battery dischargeable power to a second upper limit value that is larger than the first upper limit value. The travel control includes transient control for causing the battery to output power that is a sum of the battery dischargeable power and a temporary increase.

3 Claims, 6 Drawing Sheets

HYBRID ELECTRIC VEHICLE WITH ADAPTIVE BATTERY DISCHARGE CONTROL FOR CATALYST WARM-UP

CROSS-REFERENCE TO RELATED APPLICATION

This application claims priority to Japanese Patent Application No. 2024-035374 filed on Mar. 7, 2024, incorporated herein by reference in its entirety.

BACKGROUND

1. Technical Field

The present disclosure relates to hybrid electric vehicles.

2. Description of Related Art

Japanese Unexamined Patent Application Publication No. 2010-042700 (JP 2010-042700 A) discloses a hybrid electric vehicle including a catalyst device that reduces exhaust emissions from an engine. In the configuration described in JP 2010-042700 A, when the catalyst device needs to be warmed up and required power can be covered by the output power of a battery, the engine is driven at an idle speed to warm up the catalyst device with exhaust heat.

SUMMARY

In the configuration described in JP 2010-042700 A, even when the catalyst device needs to be warmed up, the catalyst device will not be warmed up if the required power is larger than the output limit of the battery. One possible solution to this is to increase the output limit of the battery when the catalyst device needs to be warmed up.

However, increasing the output limit of the battery causes a voltage drop to increase as the output power increases. Therefore, when larger electric power than expected is used during warm-up of the catalyst device, the voltage drop is larger than expected. Therefore, the voltage of the battery may reach the lower limit voltage in an early stage and may also become lower than the lower limit voltage. The voltage of the battery becoming lower than the lower limit voltage is not preferable from the perspective of protecting components. One way to protect components is to limit the output torque of a motor when the voltage of the battery reaches the lower limit voltage. In this case, the driving force is limited in an early stage, which causes shock, hesitation, etc.

The present disclosure provides a hybrid electric vehicle that can protect components and reduce a decrease in drivability when the output power of a battery is increased during warm-up of a catalyst device.

The present disclosure provides a hybrid electric vehicle. The hybrid electric vehicle includes:

an internal combustion engine;

an electric motor;

a battery that stores power to be supplied to the electric motor;

a catalyst device that reduces exhaust emissions from the internal combustion engine; and a control device that performs travel control for controlling the internal combustion engine and the electric motor and that performs battery control for managing the battery.

The battery control includes first discharge control for controlling discharge of the battery in a first set state when the catalyst device is not being warmed up, the first set state being a state in which a lower limit voltage of the battery is set to a first lower limit value and dischargeable power of the battery is set to a first upper limit value, and second discharge control for controlling the discharge of the battery in a second set state when the catalyst device is being warmed up, the second set state being a state in which the lower limit voltage of the battery is set to a second lower limit value smaller than the first lower limit value and the dischargeable power of the battery is set to a second upper limit value larger than the first upper limit value.

The travel control includes setting control for setting an increase by which output power of the battery is to be temporarily increased, and transient control for causing the hybrid electric vehicle to travel with the battery outputting power that is a sum of the dischargeable power of the battery and the increase, and The control device is configured to set the increase to a first increase amount during the first discharge control, set the increase to a second increase amount smaller than the first increase amount during the second discharge control, and when the control device performs the transient control during the second discharge control, cause the battery to output power that is a sum of the second upper limit value and the second increase amount.

The present disclosure can protect components and reduce a decrease in drivability when the output power of the battery is increased during warm-up of the catalyst device.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Hereinafter, hybrid electric vehicle according to the embodiment of the present disclosure will be described in detail. The present disclosure is not limited to the embodiments described below.

Figure 1:
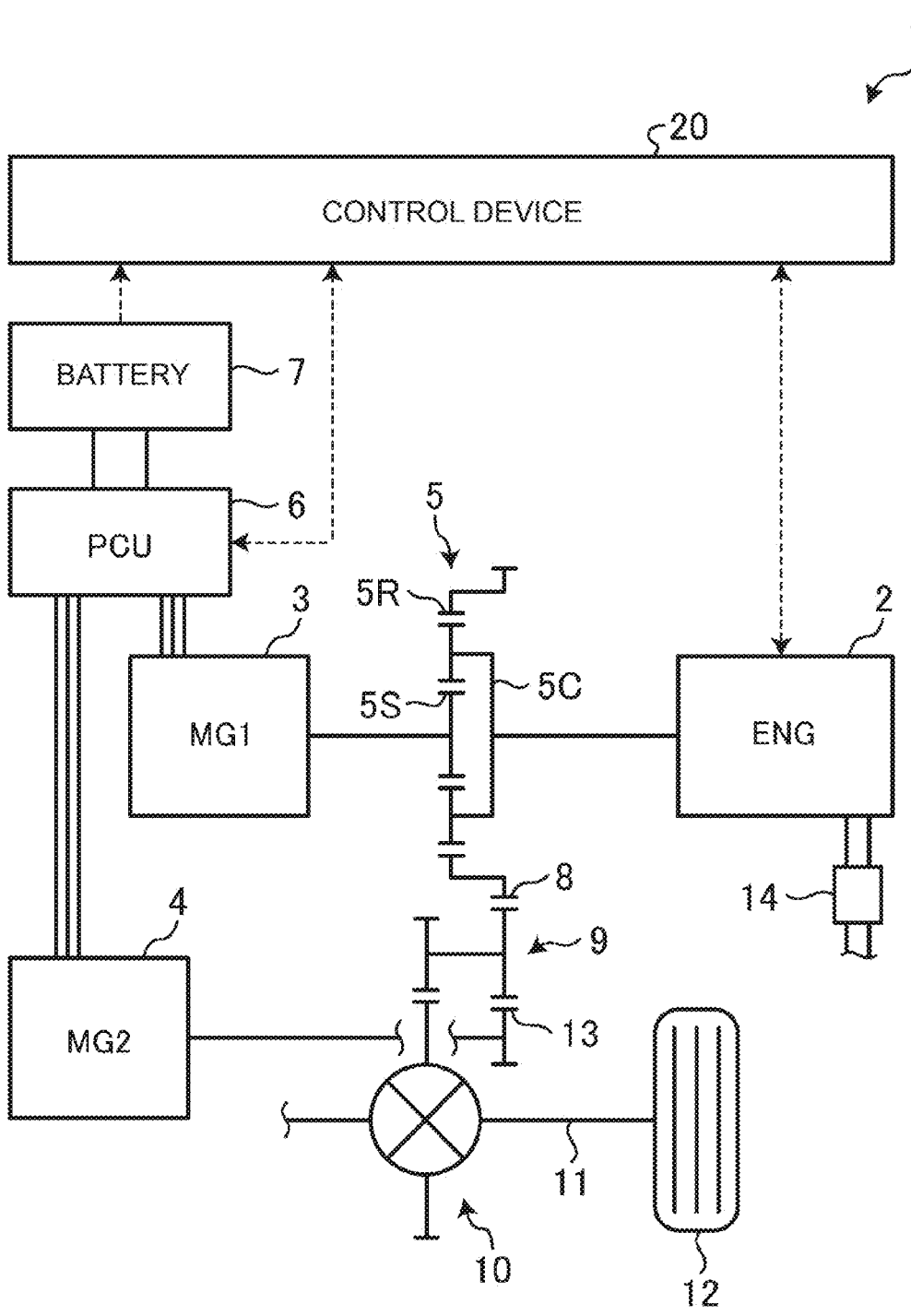
FIG. 1 is a diagram schematically illustrating a hybrid electric vehicle according to an embodiment.

FIG. 1 is a diagram schematically illustrating a hybrid electric vehicle according to an embodiment. Hybrid electric vehicle 1 includes an engine (ENG) 2, a first motor (MG1) 3, a second motor (MG2) 4, a power split mechanism 5, a PCU 6, a battery 7, and a control device 20.

Hybrid electric vehicle 1 includes an engine 2, a first motor 3, and a second motor 4 as power sources. The engine 2 is an internal combustion engine such as a gasoline engine. Each of the first motor 3 and the second motor 4 is a motor generator that functions as an electric motor and a generator, and is constituted by an electric motor such as a synchronous motor (three-phase alternating current motor). The first motor 3 mainly functions as a generator. The second motor 4 mainly functions as an electric motor. The first motor 3 and the second motor 4 are electrically connected to PCU 6. The first motor 3 is electrically connected to the second motor 4 via a PCU 6. The electric power generated by the first motor 3 is supplied to the second motor 4 via PCU 6, and the electric power can be used to output torque from the second motor 4.

PCU 6 includes a first inverter that drives the first motor 3 and a second inverter that drives the second motor 4. PCU 6 is electrically connected to the battery 7. The motors 3 and 4 are electrically connected to the battery 7 via a PCU 6. The first motor 3 is electrically connected to the battery 7 via a first inverter. The second motor 4 is electrically connected to the battery 7 via the second inverter. The battery 7 is a secondary battery that stores electric power to be supplied to the motors 3 and 4. The battery 7 can store electric power generated by the motors 3 and 4. The battery 7 is constituted by a battery pack including a plurality of battery modules in which a plurality of battery cells are stacked.

The power split mechanism 5 divides the power output from the engine 2 into a first motor 3 side and a drive shaft 11 side. The power split mechanism 5 is constituted by a single pinion type planetary gear mechanism. The power split mechanism 5 includes a sun gear 5S, a ring gear 5R, and a carrier 5C. The carrier 5C holds the pinion gear meshing with the sun gear 5S and the ring gear 5R so as to be rotatable and revolvable. The first motor 3 is connected to the sun gear 5S. An engine 2 is connected to the carrier 5C. The ring gear 5R is an output element of the power split mechanism 5 and outputs power toward the drive shaft 11. An output gear 8 is connected to the ring gear 5R. The ring gear 6R and the output gear 8 rotate together. The output gear 8 is connected to the differential mechanism 10 via a counter gear mechanism 9. The counter gear mechanism 9 includes a counter driven gear, a counter drive gear, and a counter shaft. The differential mechanism 10 includes a differential ring gear. The differential mechanism 10 is coupled to the drive wheels 12 via a drive shaft 11.

In hybrid electric vehicle 1, the torque outputted from the second motor 4 can be added to the torque transmitted from the power split mechanism 5 to the drive shaft 11. The second motor 4 is connected to the counter gear mechanism 9 via a reduction gear 13. The engine 2, the first motor 3, and the second motor 4 are both connected to the drive shaft 11 via a counter gear mechanism 9 and a differential mechanism 10. Hybrid electric vehicle 1 can execute a HV running mode in which the vehicle travels by the torque output from the engine 2 and a EV running mode in which the vehicle travels only by the torque output from the second motor 4. In HV traveling mode, the second motor 4 can apply torque.

The control device 20 is an electronic control device that controls hybrid electric vehicle 1. The control device 20 includes a microcomputer having a CPU, RAM, ROM, and an input/output interface. The control device 20 performs signal-processing in accordance with a program stored in advance in ROM. The control device 20 receives signals from various sensors mounted on hybrid electric vehicle 1. For example, a vehicle speed signal from a vehicle speed sensor that detects a vehicle speed, an accelerator operation amount signal from an accelerator operation amount sensor that detects an operation amount of an accelerator pedal, and the like are input to the control device 20. Further, for example, a temperature signal from a temperature sensor that detects the temperature of the battery 7, a current signal from a current sensor that detects the input/output current of the battery 7, a voltage signal from a voltage sensor that detects the voltage of the battery 7, and the like are input to the control device 20. The control device 20 performs various kinds of control based on signals input from various sensors. At this time, the control device 20 performs calculation using the input data and the data stored in advance, and outputs the calculation result as a command signal.

The control device 20 includes a hybrid-type electronic control device (HV-ECU), a motor-type electronic control device (MG-ECU), and a battery-type electronic control device (battery ECU). The control device 20 performs travel control for controlling the engine 2 and the motors 3 and 4, and also performs battery control for managing the battery 7. HV-ECU of the control device 20 outputs a command signal to the engine 2 to electrically control the output, start, and stop of the engine 2. In the engine 2, the fuel injection, the ignition timing, and the like are electrically controlled by the control device 20. MG-ECU of the control device 20 outputs a command signal to PCU 6 to control the motor torques of the motors 3 and 4. The battery ECU of the control device 20 manages and monitors the battery 7.

The control device 20 performs discharge control for controlling discharge of the battery 7 as battery control. The control device 20 sets the lower limit voltage Vmin of the battery 7 and the dischargeable power Wout of the battery 7. The lower limit voltage Vmin is a value set for establishing component protection. The dischargeable power Wout is the highest power that can be output that defines the limit of the output power of the battery 7. The dischargeable power Wout indicates the power limit of the battery 7. The control device 20 calculates the dischargeable power Wout based on SOC indicating the state of charge of the battery 7 and the temperature of the battery 7. The control device 20 calculates SOC based on the input/output current of the battery 7, the battery voltage, and the like.

The control device 20 calculates a required driving force based on the accelerator operation amount and the vehicle speed as the travel control. The control device 20 calculates the required power based on the required driving force and the vehicle speed. The control device 20 sets the target rotational speed and the target torque of the engine 2 based on the required power.

Hybrid electric vehicle 1 comprises a catalyst device 14 that reduces exhaust emissions from the engine 2. The catalyst device 14 is provided in an exhaust pipe of the engine 2. Hybrid electric vehicle 1 can warm up the catalyst device 14 by the exhaust heat of the engine 2. When the catalyst device 14 needs to be warmed up, the control device 20 controls the engine 2 to an idle state and warms up the catalyst device 14 by exhaust heat. The idle state is an operating state in which the rotational speed of the engine 2 is controlled to the idle rotational speed, and is a state in which the engine 2 is rotating without outputting torque.

Hybrid electric vehicle 1 has a configuration in which it is assumed that the output power of the battery 7 needs to be increased during the warm-up of the catalyst device 14 in accordance with the tightening of regulations on exhaust gases. When the output power of the battery 7 is simply increased, it is conceivable to increase the number of battery cells included in the battery 7. In this case, by increasing the number of battery cells, the size of the battery 7 is increased, and the weight is also increased. Therefore, in hybrid electric vehicle 1, the number of battery cells included in the battery 7 is not changed, and the output power of the battery 7 is increased by devising the usage.

Figure 2:
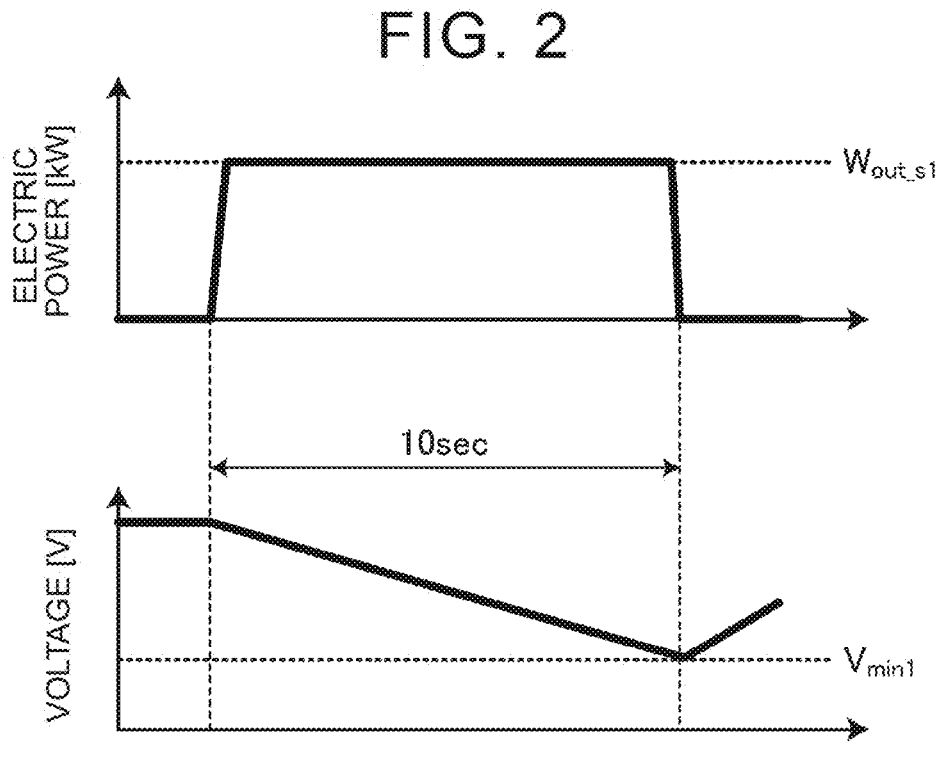
FIG. 2 is a diagram illustrating dischargeable power in a steady state and a lower limit voltage of a battery.
Figure 3:
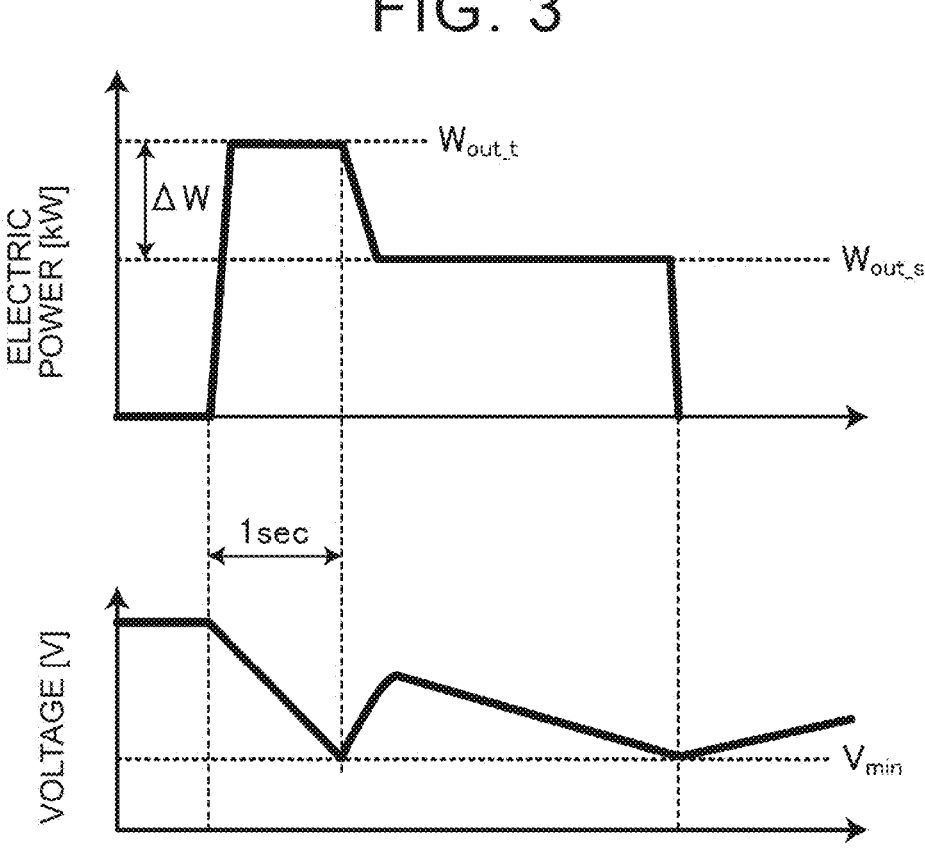
FIG. 3 is a diagram illustrating transient dischargeable power.

The control device 20 performs battery control illustrated in FIG. 2 and the travel control illustrated in FIG. 3. As illustrated in FIG. 2, the control device 20 sets the lower limit voltage Vmin of the battery 7 to the first lower limit value Vmin1, and sets the dischargeable power Wout_s in the steady state to the first upper limit value Wout_s1. The first upper limit value Wout_s1 is a power whose output duration until the voltage of the battery 7 reaches the first lower limit value Vmin1 becomes the first duration when the battery 7 continues to discharge in the dischargeable power Wout. The first duration is 10 seconds. That is, the first upper limit value Wout_s1 is the power that reaches the lower limit voltage Vmin when the dischargeable power Wout is discharged for 10 seconds. The state in which the lower limit voltage Vmin is set to the first lower limit value Vmin1 and the dischargeable power Wout_s in the steady state is set to the first upper limit value Wout_s1 is the first set state.

As illustrated in FIG. 3, the control device 20 can cause the battery 7 to output the transient dischargeable power Wout_t that is the sum of the dischargeable power Wout_s in the steady state and the temporary increase ΔW. The transient dischargeable power Wout_t is a power whose output duration until the voltage of the battery 7 reaches the lower limit voltage Vmin is one second when the dischargeable power Wout_t continues to discharge.

Figure 6:
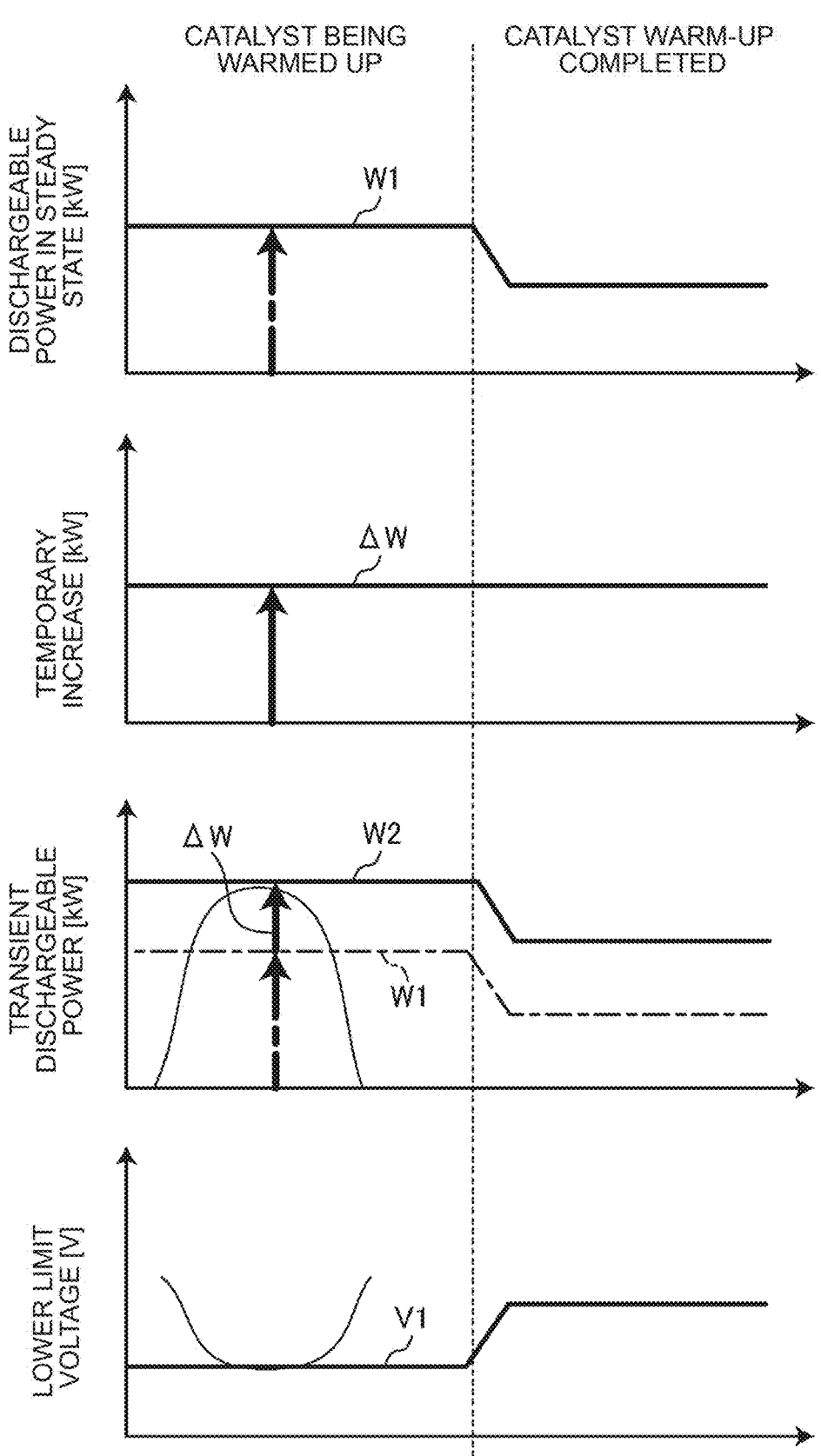
FIG. 6 is a diagram for explaining control of a comparative example.

As an example of the control, the control of the comparative example as shown in FIG. 6 may be considered. The control of the comparative example includes a battery control and a travel control. The battery control of the comparative example includes a control of increasing the dischargeable power W1 in the steady-state as compared with a case where warm-up of the catalyst is not required in a case where the catalyst is being warmed up. The definition of the dischargeable power W1 is the same as the definition of the first upper limit value Wout_s1. The dischargeable power W1 is power in which the time until the voltage of the battery reaches the lower limit voltage V1 is 10 seconds when the battery continues to discharge in the dischargeable power W1. In the battery control of the comparative example, the dischargeable power W1 in the steady-state is set differently between the case where the catalyst does not need to be warmed up and the case where the catalyst is being warmed up. The battery control of the comparative embodiment includes a control of raising the dischargeable power W1 in the steady-state by lowering the lower limit voltage V1 of the battery when the battery is in the catalytic warm-up state. The lower limit voltage V1 is smaller when the catalyst is being warmed up than when the catalyst is not being warmed up.

As shown in FIG. 6, the travel control of the comparative example includes a transient control for temporarily increasing the output power of the battery. The transient control is a control of adding a preset increase ΔW to the dischargeable power W1 in the steady state. When the transient control is performed during warm-up of the catalyst, the battery outputs a transient dischargeable power W2 that is the sum of the dischargeable power W1 in the steady state increased by the battery control and the increase ΔW temporarily increased by the travel control.

Figure 7:
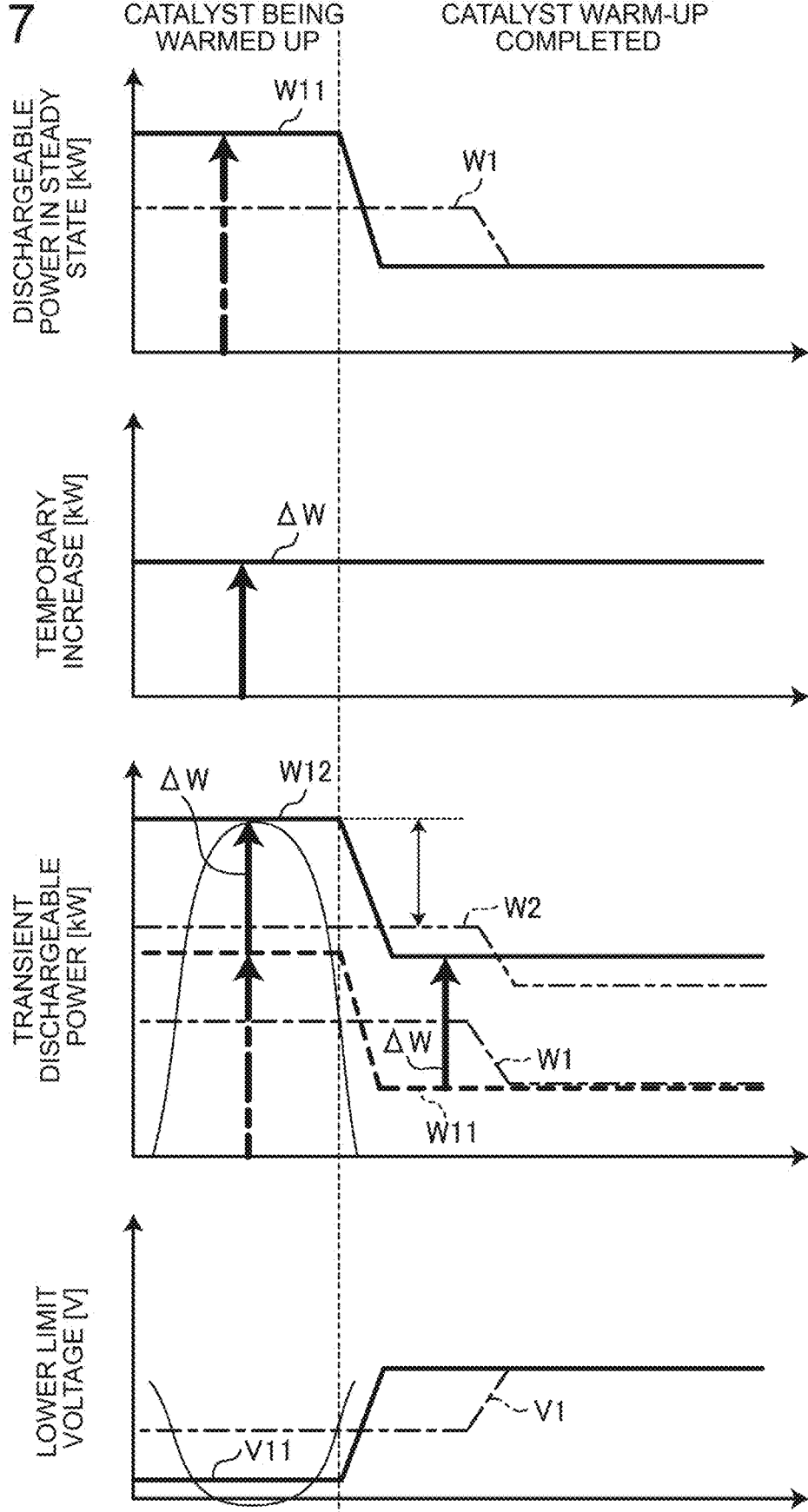
FIG. 7 is a diagram for explaining control of another comparative example.

From the control of the comparative example shown in FIG. 6, control of another comparative example as shown in FIG. 7 is conceivable in order to increase the output power during catalyst warm-up. In another comparative example shown in FIG. 7, control is performed to further increase the output power of the battery during catalyst warm-up. During the catalytic warm-up, the definitions of the dischargeable power W11 at steady-state are changed. The dischargeable power W11 at steady-state when not in catalytic warm-up is the power at which the voltage of the battery reaches the lower limit voltage V11 with 10 seconds of power usage. On the other hand, the dischargeable power W11 in the steady-state when the catalytic warm-up is in progress is the power at which the voltage of the battery reaches the lower limit voltage V11 by using the power for 5 seconds. If the temporary increase ΔW remains under the control shown in FIG. 6, the transient dischargeable power W12 that is the sum of the dischargeable power W11 in the steady state and the temporary increase ΔW becomes larger than expected during warm-up of the catalyst. Therefore, the voltage of the battery may crack the lower limit voltage V11.

Figure 4:
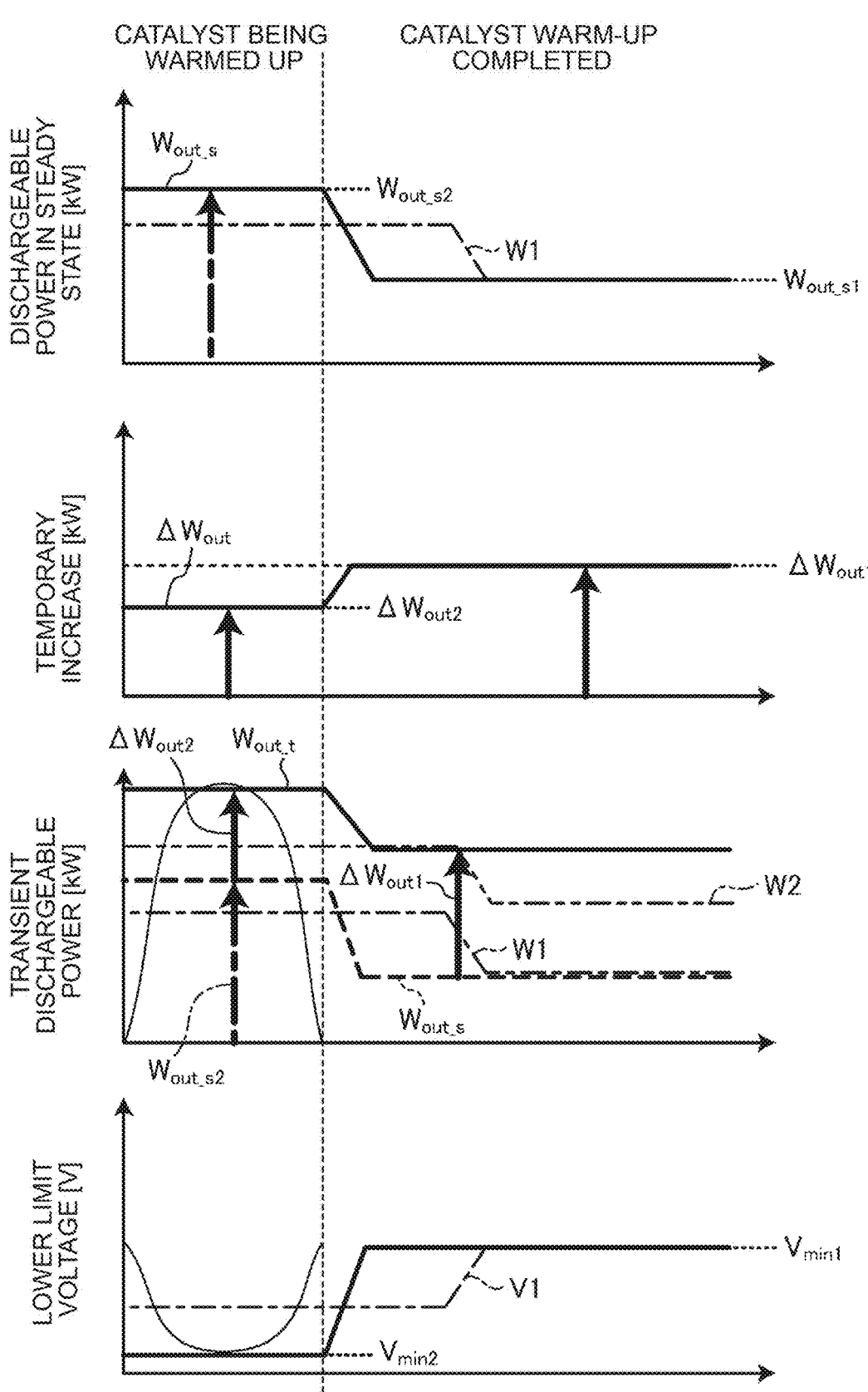
FIG. 4 is a diagram for explaining a state in which the output power of the battery is temporarily increased during catalyst warm-up.

Therefore, as shown in FIG. 4, the control device 20 uses the battery 7 by changing the definition of the dischargeable power Wout_s in the steady state in the battery control from 10 seconds to 5 seconds. In addition, the control device 20 changes the primary increase ΔWout of the output power in the travel control. The dischargeable power Wout_s in the steady state is set to a different value between the case where the catalyst device 14 is not being warmed up and the case where the catalyst device 14 is being warmed up. The primary increase ΔWout is set to a different value between the case in which the catalyst device 14 is not being warmed up and the case in which the catalyst device 14 is being warmed up. The control device 20 performs control to increase the output power of the battery 7 as compared with the conventional one, while being limited to the warm-up state of the catalyst device 14. Thus, hybrid electric vehicle 1 component is protected.

In the battery control, the control device 20 lowers the lower limit voltage Vmin of the battery 7 from the first lower limit value Vmin1 to the second lower limit value Vmin2 when the catalytic warm-up is being performed. Accordingly, the control device 20 raises the dischargeable power Wout in the steady-state from the first upper limit value Wout_s1 to the second upper limit value Wout_s2. The control device 20 performs the first discharge control when the catalyst device 14 is not being warmed up, and performs the second discharge control when the catalyst device 14 is not being warmed up. The battery control includes the first discharge control and the second discharge control. The first discharge control is a discharge control for controlling the discharge of the battery 7 in the first set state when the catalyst device 14 is not being warmed up. The first set state is a state in which the lower limit voltage Vmin of the battery 7 is set to the first lower limit value Vmin1 and the dischargeable power Wout_s in the steady state of the battery 7 is set to the first upper limit value Wout_s1. The second discharge control is a discharge control for controlling the discharge of the battery 7 in the second set state when the catalyst device 14 is being warmed up. The second set state is a state in which the lower limit voltage Vmin of the battery 7 is set to the second lower limit value Vmin2 smaller than the first lower limit value Vmin1, and the dischargeable power Wout_s in the steady state of the battery 7 is set to the second upper limit value Wout_s2 larger than the first upper limit value Wout_s1.

The first upper limit value Wout_s1 is set to a power whose output duration until the voltage of the battery 7 reaches the first lower limit value Vmin1 when the battery 7 continues to discharge with the dischargeable power Wout_s in the steady state becomes the first duration. The first duration is, for example, 10 seconds. The second upper limit value Wout_s2 is set to a power whose output duration is a second duration shorter than the first duration. This output duration is the time until the voltage of the battery 7 reaches the second lower limit value Vmin2 when the battery 7 continues to discharge with the dischargeable power Wout_s in the steady state. The second duration is, for example, 5 seconds.

The control device 20 performs the transient control in the travel control. The transient control is control for traveling with the battery 7 outputting the transient dischargeable power Wout_t that is the sum of the dischargeable power Wout_s in the steady state of the battery 7 and the temporary increase ΔWout. The control device 20 performs setting control for setting an increase ΔWout when the output power of the battery 7 is temporarily increased. The travel control includes setting control and transient control. The control device 20 sets the increase ΔWout to the first increase amount ΔWout1 during the first discharge control. The control device 20 sets the increase ΔWout to the second increase amount ΔWout2 smaller than the first increase amount ΔWout1 during the second discharge control.

The first increase amount ΔWout1 is set to a power whose output duration is a third duration shorter than the second duration. The output duration is a time until the voltage of the battery 7 reaches the first lower limit value Vmin1 when the battery 7 continues to output the electric power that is the sum of the first upper limit value Wout_s1 and the increase ΔWout. The third duration is, for example, one second. The second increase amount ΔWout2 is set to the power whose output duration is the third duration. The output duration is a time until the voltage of the battery 7 reaches the second lower limit value Vmin2 when the battery 7 continues to output the electric power that is the sum of the second upper limit value Wout_s2 and the increase ΔWout.

Figure 5:
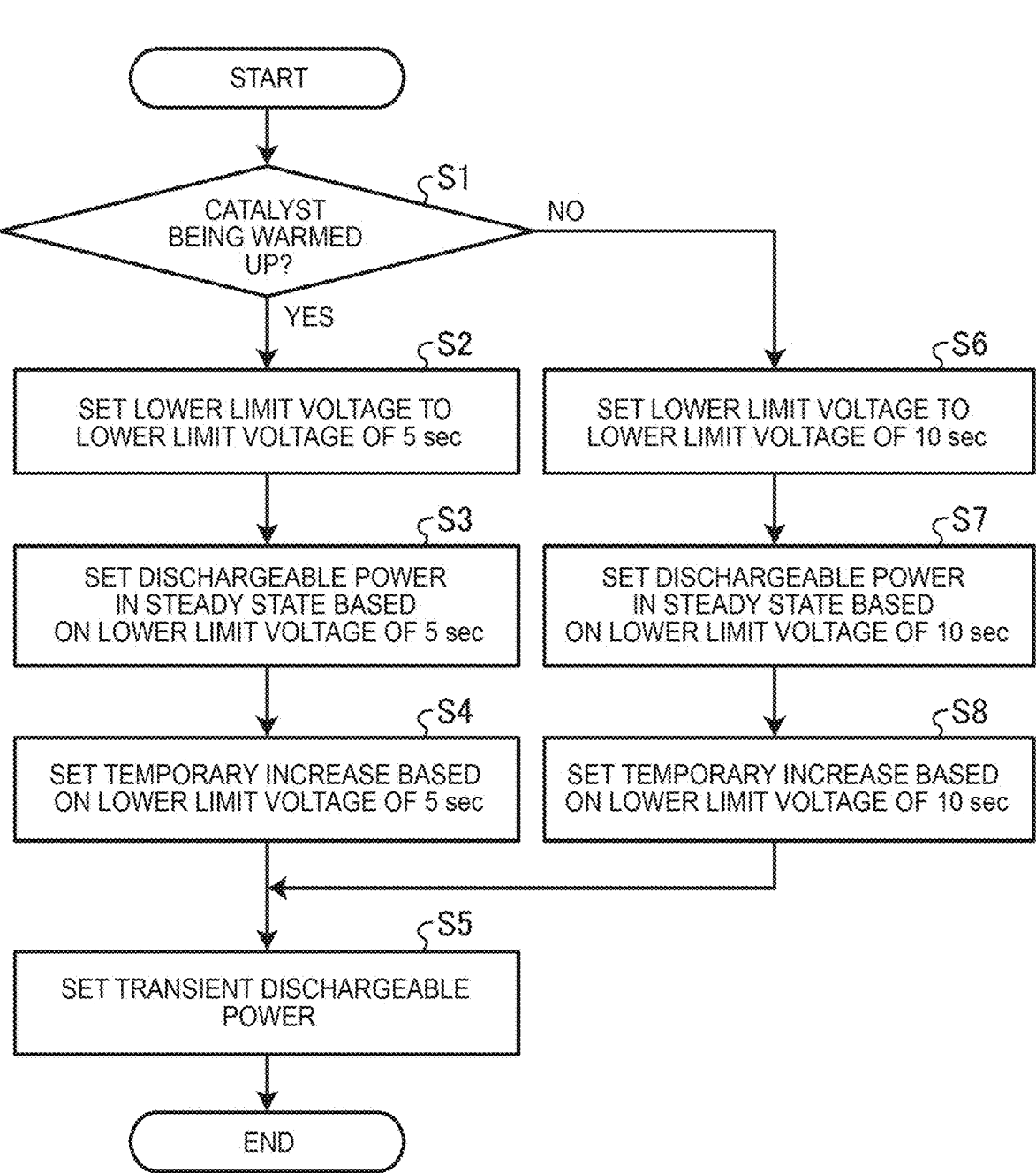
FIG. 5 is a flowchart illustrating a setting process flow.

FIG. 5 is a flowchart illustrating a setting process flow. The control illustrated in FIG. 2 is repeatedly performed by the control device 20.

The control device 20 determines whether the catalyst device 14 is being warmed up (S1).

When the catalyst device 14 is being warmed up (S1: Yes), the control device 20 sets the lower limit voltage Vmin of the battery 7 to the lower limit voltage in 5 seconds (S2). In S2, the lower limit voltage Vmin is reduced from the first lower limit value Vmin1 that is set when the catalyst is not being warmed up. The control device 20 sets the lower limit voltage Vmin to the second lower limit value Vmin2.

The control device 20 sets the dischargeable power Wout_s in the steady-state based on the lower limit voltage in 5 seconds (S3). In S3, the definition of the dischargeable power Wout_s at steady-state is changed to 5 seconds. The control device 20 sets the dischargeable power Wout_s based on the second lower limit value Vmin2. The control device 20 sets the second upper limit value Wout_s2, which is larger than the first upper limit value Wout_s1 set when the catalyst is not warmed up, to the dischargeable power Wout_s in the steady state.

The control device 20 sets the increase ΔWout by which the output power of the battery 7 is temporarily increased based on the lower limit voltage in 5 seconds (S4). In S4, the temporary increase ΔWout is set to the second increase amount ΔWout2.

The control device 20 sets the transient dischargeable electric power Wout_t to the electric power that is the sum of the dischargeable power Wout_s in the steady state and the temporary increase ΔWout (S5). In S5, the sum of the second upper limit value Wout_s2 set in S3 and the second increase amount ΔWout2 set in S4 to is set to the transient dischargeable power Wout_t2. When S5 process is performed, the control routine ends.

When the catalyst device 14 is not being warmed up (S1: No), the control device 20 sets the lower limit voltage Vmin of the battery 7 to the lower limit voltage in 10 seconds (S6). In S6, the lower limit voltage Vmin is set to the first lower limit value Vmin1.

The control device 20 sets the dischargeable power Wout_s in the steady-state based on the lower limit voltage in 10 seconds (S7). In S7, the dischargeable power Wout_s at steady-state is defined as 10 seconds. The control device 20 sets the dischargeable power Wout_s to the first upper limit value Wout_s1.

The control device 20 sets the increase ΔWout by which the output power of the battery 7 is temporarily increased based on the lower limit voltage in 10 seconds (S8). In S8, the temporary increase ΔWout is set to the first increase amount ΔWout1. When S8 process is performed, the control routine proceeds to S5.

When the process proceeds from S8 to S5, the sum of the first upper limit value Wout_s1 set in S7 and the first increase amount ΔWout1 set in S8 is set to the transient dischargeable power Wout_t1.

As described above, according to the embodiment, when the dischargeable power Wout_s in the steady-state is raised during the catalytic warm-up, the voltage of the battery 7 is less likely to decrease to the lower limit voltage Vmin. Accordingly, it is possible to suppress the output torque of the motor from being limited due to the voltage of the battery 7 reaching the lower limit voltage Vmin during the catalytic warm-up. As a result, it is possible to protect components and reduce a decrease in drivability during warm-up of the catalyst.

What is claimed is:

1. A hybrid electric vehicle comprising:
an internal combustion engine;
an electric motor;
a battery that stores power to be supplied to the electric motor;
a catalyst device that reduces exhaust emissions from the internal combustion engine; and
a control device that performs travel control for controlling the internal combustion engine and the electric motor and that performs battery control for managing the battery, wherein
the battery control includes
first discharge control for controlling discharge of the battery in a first set state when the catalyst device is not being warmed up, the first set state being a state in which a lower limit voltage of the battery is set to a first lower limit value and dischargeable power of the battery is set to a first upper limit value, and
second discharge control for controlling the discharge of the battery in a second set state when the catalyst device is being warmed up, the second set state being a state in which the lower limit voltage of the battery is set to a second lower limit value smaller than the first lower limit value and the dischargeable power of the battery is set to a second upper limit value larger than the first upper limit value,
the travel control includes
setting control for setting an increase by which output power of the battery is to be temporarily increased, and transient control for causing the hybrid electric vehicle to travel with the battery outputting power that is a sum of the dischargeable power of the battery and the increase, and the control device is configured to set the increase to a first increase amount during the first discharge control, set the increase to a second increase amount smaller than the first increase amount during the second discharge control, and when the control device performs the transient control during the second discharge control, cause the battery to output power that is a sum of the second upper limit value and the second increase amount.

2. The hybrid electric vehicle according to claim 1, wherein:

the first upper limit value is set to such power that an output duration until a voltage of the battery reaches the first lower limit value when the battery continues to discharge at the dischargeable power is a first duration; and the second upper limit value is set to such power that an output duration until the voltage of the battery reaches the second lower limit value when the battery continues to discharge at the dischargeable power is a second duration shorter than the first duration.

3. The hybrid electric vehicle according to claim 2, wherein:

the first increase amount is set to such power that an output duration until the voltage of the battery reaches the first lower limit value when the battery continues to output power that is a sum of the first upper limit value and the increase is a third duration shorter than the second duration; and the second increase amount is set to such power that an output duration until the voltage of the battery reaches the second lower limit value when the battery continues to output power that is a sum of the second upper limit value and the increase is the third duration.

\* \* \* \* \*